(12) United States Patent
Ushihara et al.

(10) Patent No.: US 7,202,659 B2
(45) Date of Patent: Apr. 10, 2007

(54) ROTATION ANGLE-DETECTING DEVICE

(75) Inventors: Masaharu Ushihara, Hirakata (JP); Kouji Oike, Otokuni-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/511,729

(22) PCT Filed: Mar. 3, 2004

(86) PCT No.: PCT/JP2004/002593

§ 371 (c)(1),
(2), (4) Date: Oct. 19, 2004

(87) PCT Pub. No.: WO2004/081490

PCT Pub. Date: Sep. 23, 2004

(65) Prior Publication Data

US 2005/0104580 A1 May 19, 2005

(30) Foreign Application Priority Data

Mar. 11, 2003 (JP) ............................ 2003-064882

(51) Int. Cl.
*G01B 7/30* (2006.01)
(52) U.S. Cl. .................... 324/207.25; 324/207.21
(58) Field of Classification Search ........... 324/207.25, 324/207.23, 207.11, 207.13, 207.14, 207.2, 324/207.21; 123/612, 617; 73/DIG. 2–3
See application file for complete search history.

(56) References Cited

U.S. PATENT DOCUMENTS

| 5,602,472 A | * | 2/1997 | Bergstedt et al. | ...... 324/207.25 |
| 6,861,837 B1 | * | 3/2005 | Shimizu et al. | ........ 324/207.25 |
| 6,909,281 B2 | * | 6/2005 | Gassman et al. | ...... 324/207.24 |
| 6,909,282 B2 | * | 6/2005 | Onishi et al. | .......... 324/207.25 |

FOREIGN PATENT DOCUMENTS

| JP | 11-500828 | 1/1999 |
| JP | 2001-165609 | 6/2001 |
| JP | 2002-213910 | 7/2002 |
| JP | 2003-4485 | 1/2003 |

* cited by examiner

*Primary Examiner*—Reena Aurora
(74) *Attorney, Agent, or Firm*—Steptoe & Johnson LLP

(57) ABSTRACT

The rotation angle-detecting device has a main rotator and two detecting rotators that rotate as the main rotator rotates. Each of the two detecting rotators has a magnet and a magnetic detector. As the detecting rotator rotates, a change occurs in magnetic lines of force from the magnet. From the change, the magnetic detector detects rotation of the detecting rotator. According to the rotation detected, the device determines the rotation angle of the main rotator. In addition, a ring-shaped ferromagnetic body is disposed around the magnet or the magnetic detector of the detecting rotator. The structure described above enables magnetic detection without disturbance in each magnetic field of the magnets, and even in a downsized structure, the device can detect the rotation angle with high accuracy.

9 Claims, 7 Drawing Sheets

ROTATION ANGLE-DETECTING DEVICE

This application is a U.S. national phase application of PCT international application PCT/JP2004/002593.

TECHNICAL FIELD

The present invention relates to a device for detecting a rotation angle of a steering wheel, employed for a control system and the like in an automobile.

BACKGROUND ART

Japanese translation of PCT publication No. H11-500828 introduces a detector for detecting a rotation angle of a main rotator, such as a steering wheel of an automobile that rotates beyond 360° within a predetermined rotation range. The conventional detector contains a first gear fitted with the main rotator and at least two rotators, i.e., a second rotator and a third rotator that cooperate with the first gear. The second and the third rotators have a second and a third gears, respectively. Each sensor for the second and the third rotators detects each rotation angle of the two rotators, and from the phase difference between the second and the third rotators, the rotation angle of the main rotator is found.

According to the conventional rotation angle-detecting device, however, the first gear through which a steering shaft is fitted has a large diameter, accordingly, the diameter of a bearing inevitably becomes large. Therefore, the first gear tends to have a distortion. To avoid the inconvenience, the first gear has to be loosely fitted with the steering shaft. Similarly, a large clearance is required in each engagement between the first and the second gears, and between the second and the third gears. The loose fit brings a relatively large play between the second and the third gears, and therefore, an error of measurement occurs in the two sensors in evaluating an absolute angle.

As another inconvenience in the conventional structure, in reducing the size of the device, the magnets built in the second and the third gears interfere magnetic lines with each other, thereby degrading the accuracy in determining the rotation angle.

DISCLOSURE OF THE INVENTION

The rotation angle-detecting device of the present invention contains a first detecting rotator; a second detecting rotator; a first magnet; a second magnet; a first magnetic detector; a second magnetic detector; a ferromagnetic body encircling any one of the first and the second magnets and the first and the second magnetic detectors; and a calculator. Having a mesh engagement with the main rotator, the first detecting rotator rotates at a speed higher than the main rotator. The first magnet is located at the center of the first detecting rotator. The first magnetic detector is arranged adjacent to the surface opposite to the first magnet. The second detecting rotator meshes with the first detecting rotator, and rotates at a speed different from that of the first detecting rotator. The second magnet is situated at the center of the second detecting rotator. The second magnetic detector is arranged adjacent to the surface opposite to the second magnet.

DETAILED DESCRIPTION OF CARRYING OUT OF THE INVENTION

Figure 1:
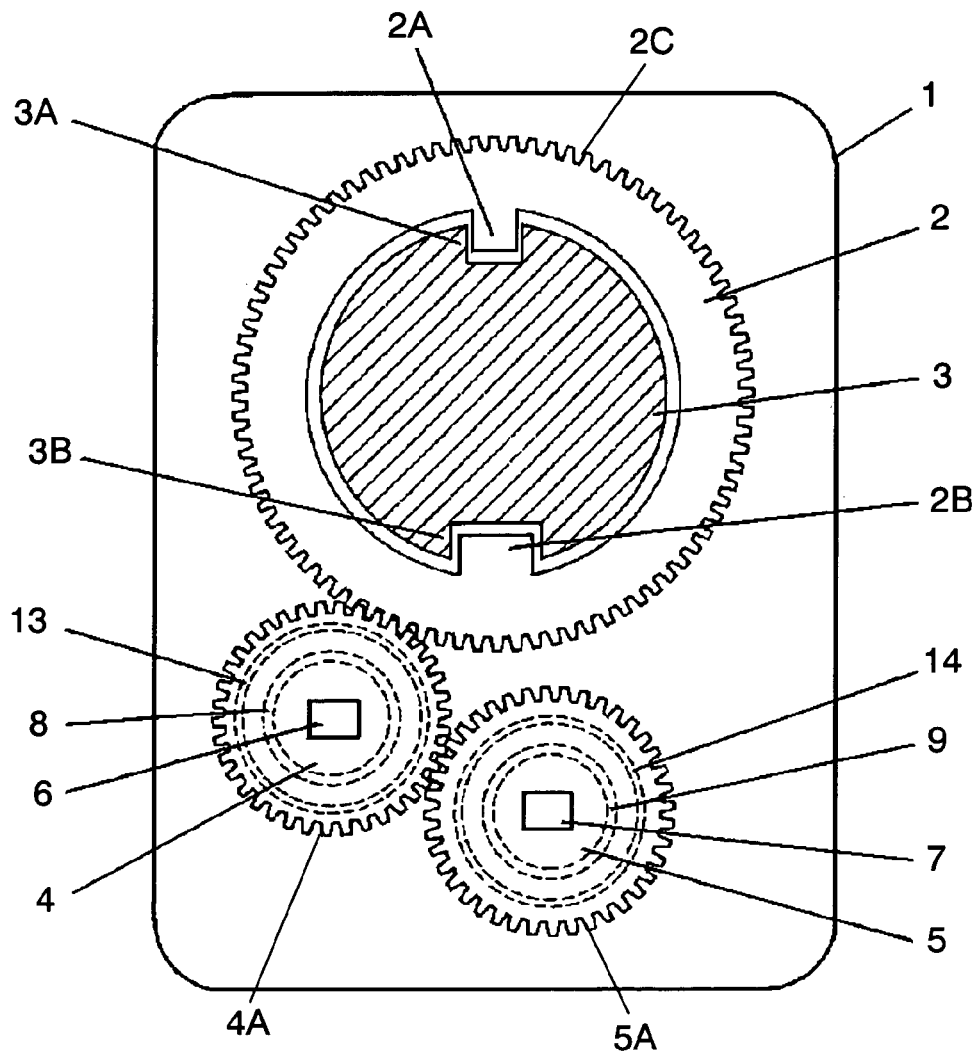
FIG. 1 shows the structure of a rotation angle-detecting device of an exemplary embodiment of the present invention.
Figure 2:
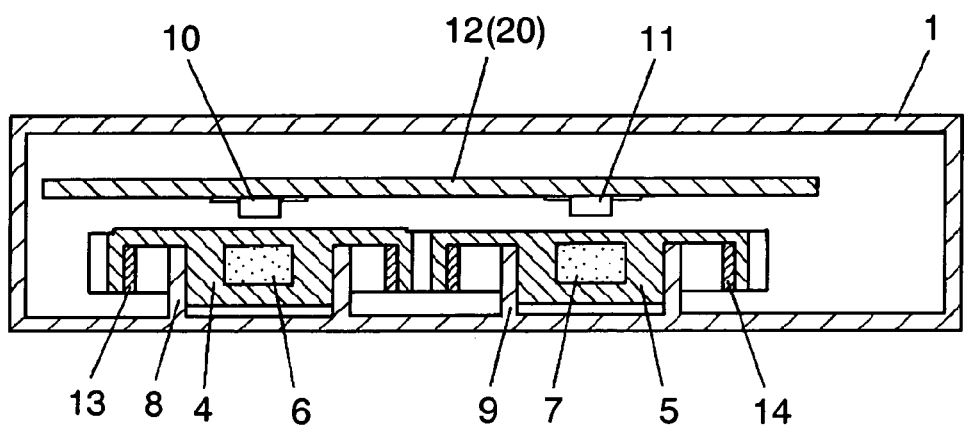
FIG. 2 is a side sectional view of the rotation angle detecting section of the device shown in FIG. 1.

FIG. 1 shows the structure of a rotation angle-detecting device of an exemplary embodiment of the present invention. FIG. 2 is a side sectional view of the rotation angle detecting section of the device. Main rotator 2 has gear 2C on its perimeter. Steering shaft 3 runs through the center of main rotator 2. Projections 2A and 2B of main rotator 2 are fitted in grooves 3A and 3B, respectively, of steering shaft 3. Rotatably fixed around bearing 8, first detecting rotator (hereinafter referred to as rotator) 4 has gear 4A on its perimeter. Gear 4A has a meshing engagement with gear 2C of main rotator 2. Rotator 4 has a diameter smaller than that of main rotator 4, that is, rotator 4 rotates faster than main rotator 2. Similarly, second detecting rotator (hereinafter, rotator) 5 is rotatably fixed around bearing 9. Gear 5A, which is formed on the perimeter of rotator 5, has a meshing engagement with the gear of rotator 4. Rotator 5 has a diameter slightly larger than that of rotator 4, so rotator 4 and rotator 5 rotate at different speed.

Rotators 4 and 5 have magnets 6 and 7 on the rotation axes, respectively. First anisotropic magnetic resistance (AMR) element 10 and second AMR element 11, which are magnetic detectors, are mounted on circuit board (hereinafter, PCB) 12. AMR elements 10 and 11 confront magnet 6 and 7, respectively, in such a way that each central axis of elements 10 and 11 coincides with each rotation axis of magnets 6 and 7. Each interval between magnet 6 and AMR element 10, and between magnet 7 and AMR element 11 ranges from 0.5 mm to 3 mm. In rotators 4 and 5, ring-shaped ferromagnetic bodies 13 and 14 are disposed so as to encircle magnets 6 and 7, respectively. PCB 12 has at least calculator 20 for calculating the rotation angle of main rotator 2 according to the output from AMR elements 10 and 11. Case 1 accommodates all the components above.

Figure 3:
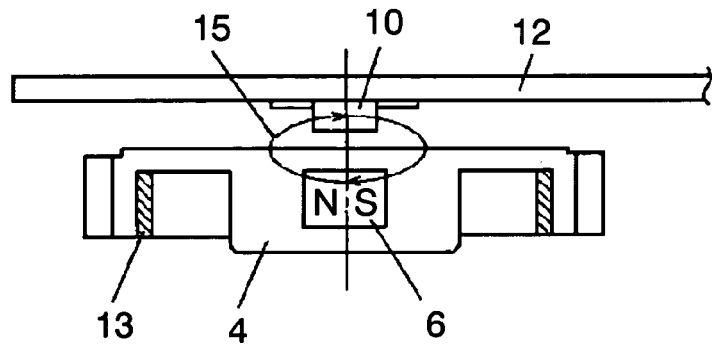
FIG. 3 shows the structure on the periphery of a detecting rotator and a magnetic detector of the device shown in FIG. 1.
Figure 4:
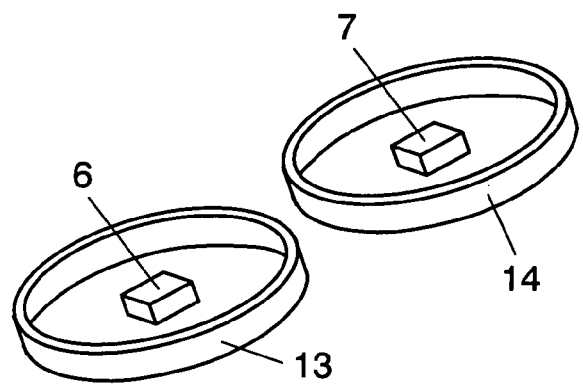
FIG. 4 is a perspective view showing the positional relationship between a magnet and a ferromagnetic body of the device shown in FIG. 1.
Figure 5A:
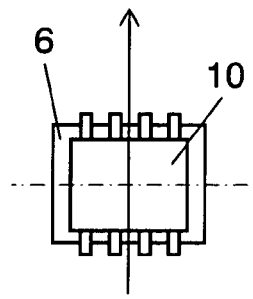
FIG. 5A through FIG. 5C are plan views showing the positional relationship between the magnet and an anisotropic magnetic resistance (AMR) element of the device shown in FIG. 1.
Figure 5B:
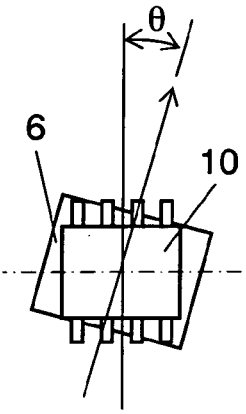
Figure 5C:
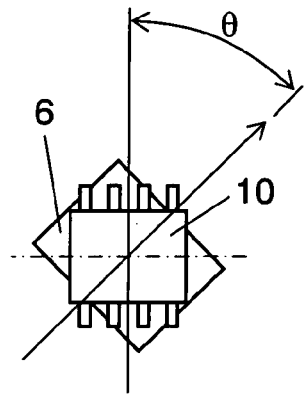

FIG. 3 is an enlarged view illustrating the relationship of rotator 4, magnet 6, AMR element 10, and ferromagnetic body 13. Magnetic line 15 from magnet 6 pass through AMR element 10, and by which, AMR element 10 outputs a voltage. FIG. 4 is a perspective view illustrating the positional relationship of magnets 6, 7 and ring-shaped ferromagnetic bodies 13, 14. FIG. 5A through FIG. 5C are plan views showing the positional relationship between magnet 6 and AMR element 10 in rotating rotator 4.

Figure 6:
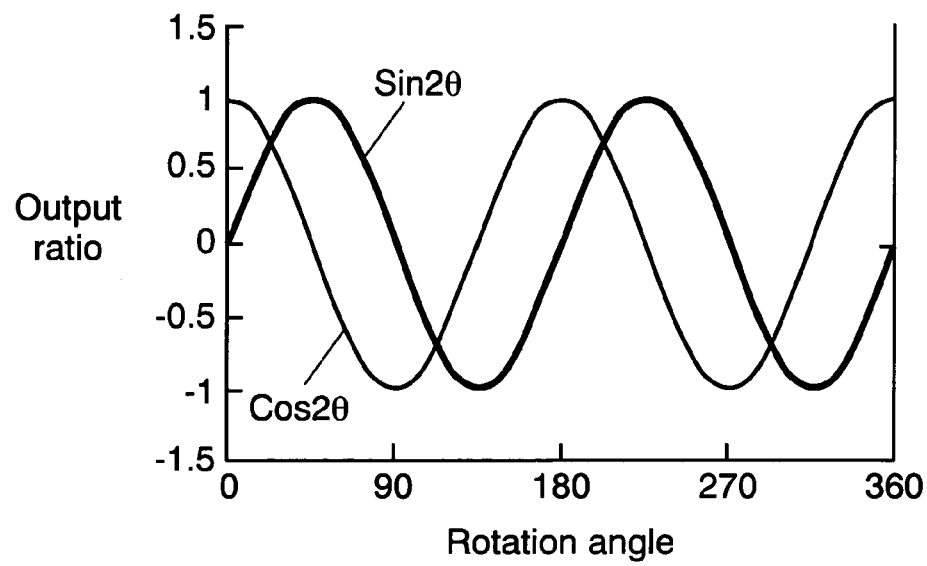
FIG. 6 is a graph showing a sin 2θ-signal and a cos 2θ-signal detected by the AMR element through the rotation of the detecting rotator of the device shown in FIG. 1.
Figure 7:
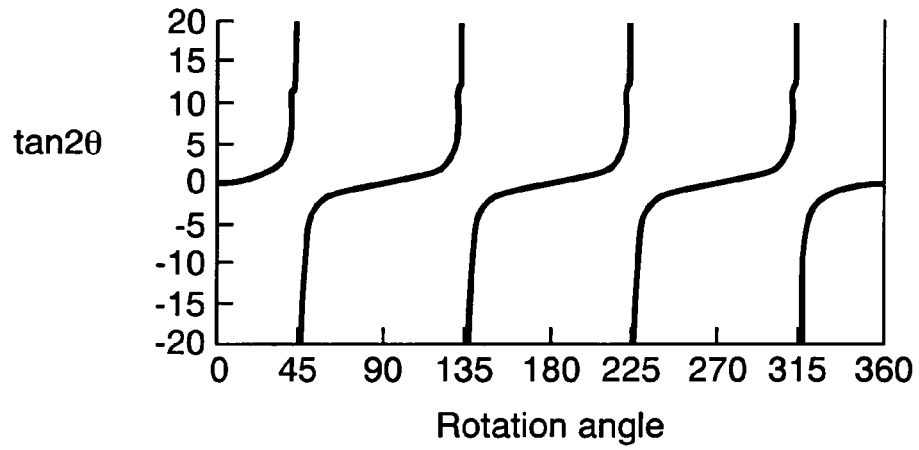
FIG. 7 is a graph showing a tan 2θ-signal derived from FIG. 6.
Figure 8:
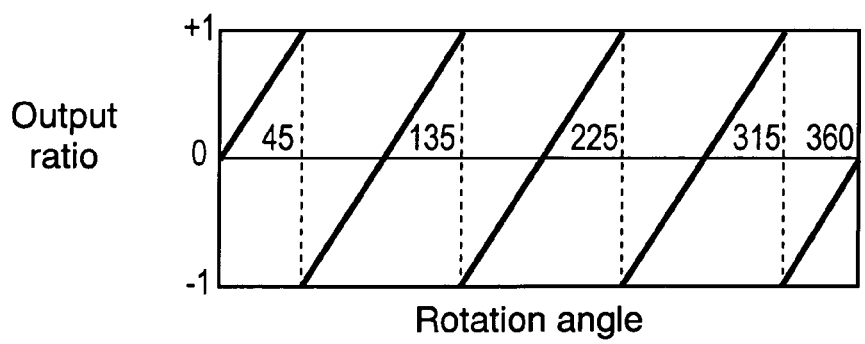
FIG. 8 is a graph showing 2θ derived from FIG. 7.
Figure 9:
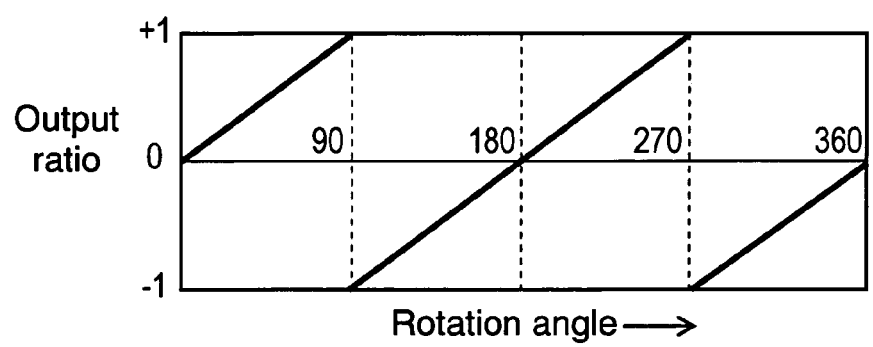
FIG. 9 is a graph showing θ derived from FIG. 8.

Magnet 6 leaves the reference position as shown in FIG. 5A and rotates sequentially with an angle of θ as shown in FIGS. 5B and 5C with respect to AMR element 10 mounted on PCB 12. In the rotation of magnet 6, AMR element 10 outputs a voltage shown by a sin 2θ-curve and a cos 2θ-curve having a period of 2θ, as shown in FIG. 6. The graph of FIG. 7 shows tan 2θ-curves derived from the two curves above, which is obtained by calculation at calculator 20 on PCB 12. Calculator 20 further calculates 2θ from arctan 2θ to acquire the saw-tooth graph shown in FIG. 8. Through the calculation, rotation angle θ of rotator 4 is represented by the graph of FIG. 9. More specifically, AMR element 10 on PCB 12 outputs two signals corresponding to rotation angle of θ for one rotation of the rotator 4.

Figure 10:
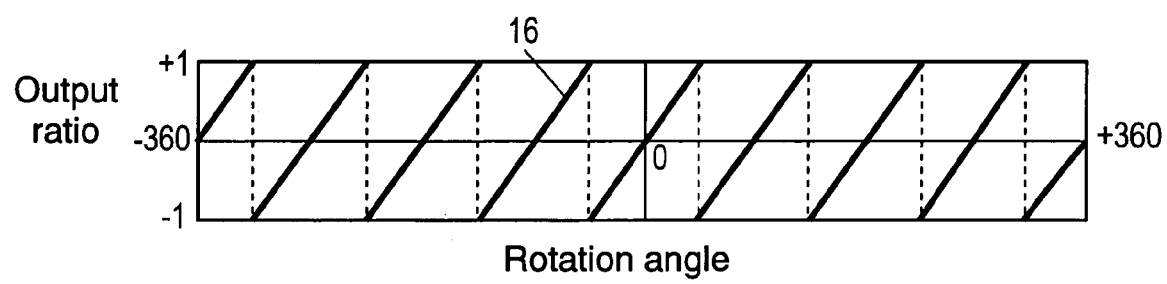
FIG. 10 is a graph showing the relationship between the rotation angle of the main rotator and the rotation angle signal obtained from a first detecting rotator of the device shown in FIG. 1.

Now suppose that the perimeter ratio of main rotator 2 to rotator 4 is 2 to 1, and suppose that the entire range of rotation of main rotator 2, which corresponds to the entire rotation angle of the steering wheel, has two rotations—one rotation in a clockwise direction, and the other in a counterclockwise direction. In this case, the rotation angle signal, which represents the rotation angle of rotator 4, fed from AMR element 10 is converted into the saw-tooth graph formed of a plurality of linear segments 16, as shown in FIG. 10. The horizontal axis of the graph represents a rotation angle of main rotator 2. The rotation angle of rotator 4—represented by linear segments 16—can be accurately obtained with two-times higher resolution than the structure of main rotator 2 on which a magnet and a magnetic detector are mounted.

Figure 11:
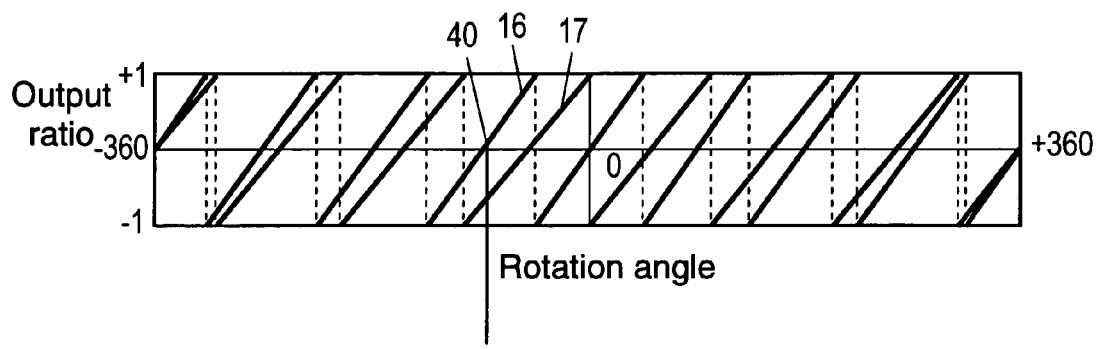
FIG. 11 is a graph showing the relationship between the rotation angle of the main rotator and the rotation angle signals obtained from the first detecting rotator and a second detecting rotator of the device shown in FIG. 1.
Figure 12:
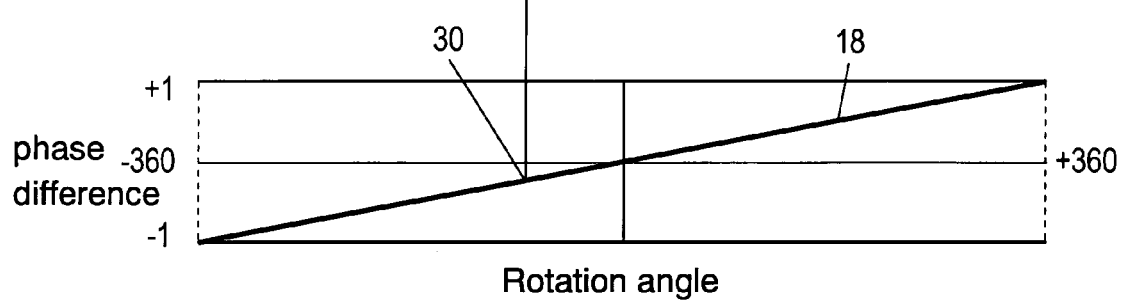
FIG. 12 is a graph showing the phase difference between the first and the second detecting rotators obtained from FIG. 11.

As is the case of rotator 4, the rotation angle of rotator 5 is obtained in a like manner. Having the diameter slightly larger than that of rotator 4, rotator 5 rotates at a slower speed. Linear segment 17 of FIG. 11 shows the rotation angle fed from second AMR element 11. Linear segment 17 indicating the rotation angle of rotator 5 has a tilt milder than linear segment 16 that indicates the rotation angle of rotator 4. Now suppose that the gear ratio of rotator 4 and rotator 5 is set as shown in the graph of FIG. 11—linear segment 16 corresponding to the rotation angle of rotator 4 and linear segment 17 corresponding to the rotation angle of rotator 5, which start at the same position of the left limit of the entire steering range, appear with a gradual interval and, finally meet at the right limit of the steering range. FIG. 12 is a graph showing the difference in two angles (i.e., phase difference) as a signal.

Linear segment 18 indicates the phase difference between the rotation angles of rotator 4 and rotator 5. Calculating the rotation angle in two or more rotations of main rotator 2 has following steps: determining an approximation of the angle position (point 30) in the entire area of the graph; determining that how many linear segments are there between the left end of the graph and point 30; and tracking down the location of the exact angle position (point 40) from the accurate graph of FIG. 11. In this way, an absolute angle position in a broad area brought by two or more rotations can be accurately obtained.

The entire rotation range of main rotator 2 can be set to two or more rotations, for example, to four or five rotations. Besides, by setting the gear ratio of rotator 4 to main rotator 2 so as to be lower than the ratio of 1:2, a higher resolution in determining rotation angle can be expected. According to this detecting method, an error caused by changes in temperature is canceled out in the process of converting the sin 2θ and cos 2θ into the tan2θ, which minimizes the error of measurement over a wide temperature range.

Figure 13:
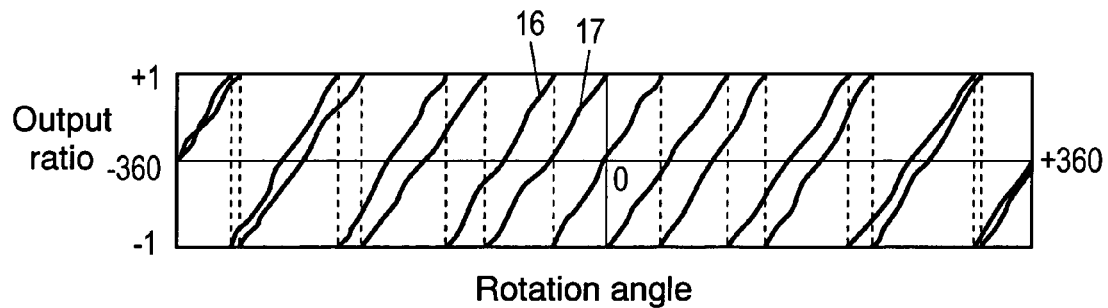
FIG. 13 is a graph showing each rotation angle signal from the first and the second detecting rotators under the condition in which the interference of magnetic lines occurs.
Figure 14:
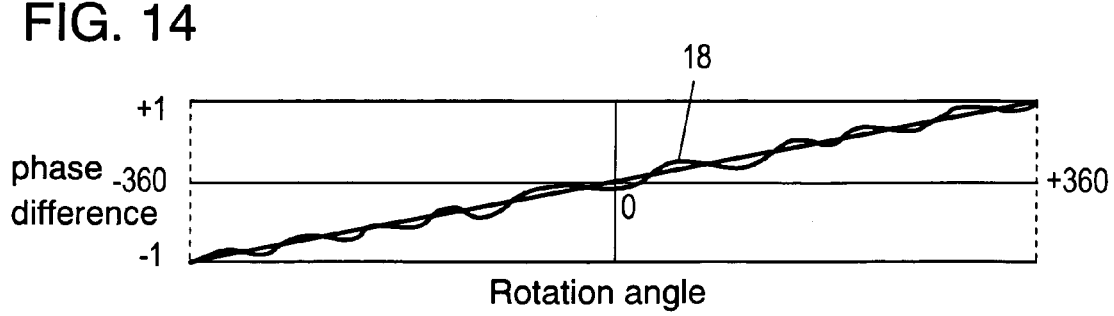
FIG. 14 is a graph showing the phase difference between the first and the second detecting rotators obtained from FIG. 13.

In the present embodiment, however, rotator 4 is directly connected with rotator 5; accordingly, magnets 6 and 7 are closely located. The smaller the size of the structure is, the closer magnet 6 and magnet 7 provided on rotators 4, 5, respectively are. Due to the adjacency, magnet lines of force 15 from magnets 6 and 7 interfere with each other, thereby disturbing the direction of magnet lines of force 15 around the two magnets. The disturbance in the magnet lines of force results in the distorted line segments shown in FIG. 13, which should be linear shown in FIG. 11; accordingly, a distortion occurs in the phase difference shown in FIG. 14. In such an improper condition, two or more line segments, or different line segment can be incorrectly selected, that is, a lack of accuracy in detecting angle will result.

According to this embodiment, ferromagnetic bodies 13 and 14 encircle the magnets 6 and 7, respectively. Ferromagnetic bodies 13 and 14 prevent magnetic lines 15 from leakage outside. Therefore, each magnetic line 15 from magnets 6 and 7 has no interference therebetween. As a result, the rotation signals obtained from rotators 4 and 5 are detected as straight-line segments in FIGS. 10, 11, and 12. Even in a downsized structure, the rotation angle can be detected with high accuracy. Each of ferromagnetic bodies 13 and 14 can also be a barrier against a magnetic field as disturbance from outside, which contributes to the detection with higher accuracy. The fact that the magnetic lines from magnets 6 and 7 are kept in parallel with each other increases the detecting accuracy of AMR elements 10 and 11.

It is preferable that the interval between magnet 6 and AMR element 10 or between magnet 7 and AMR element 11 be smaller than the interval between magnet 6 and ferromagnetic body 13 or between magnet 7 and ferromagnetic body 14—less than one tenth. With the structure, magnetic lines 15 from magnets 6 and 7 have no adverse effect of being absorbed by ferromagnetic bodies 13 and 14 encircling magnets 6 and 7.

In addition, rotator 5 has no contact with main rotator 2 that is fixed to steering shaft 3 with a rather large play therebetween. Rotator 5 is arranged to mesh only with rotator 4, which is fixed to bearing 8 of case 1 with a slight play. Therefore, rotator 4 and rotator 5 have a slight play therebetween. Thus, linear segments 16 and 17 in FIG. 11, free from distortion (i.e., backlash), proves high detecting accuracy of the device. Accordingly, the linear segment in FIG. 12 also offers high reliability, the device provides a measuring system of rotation angle in multi-rotation with high reliability and minimized error of measurement.

Figure 15:
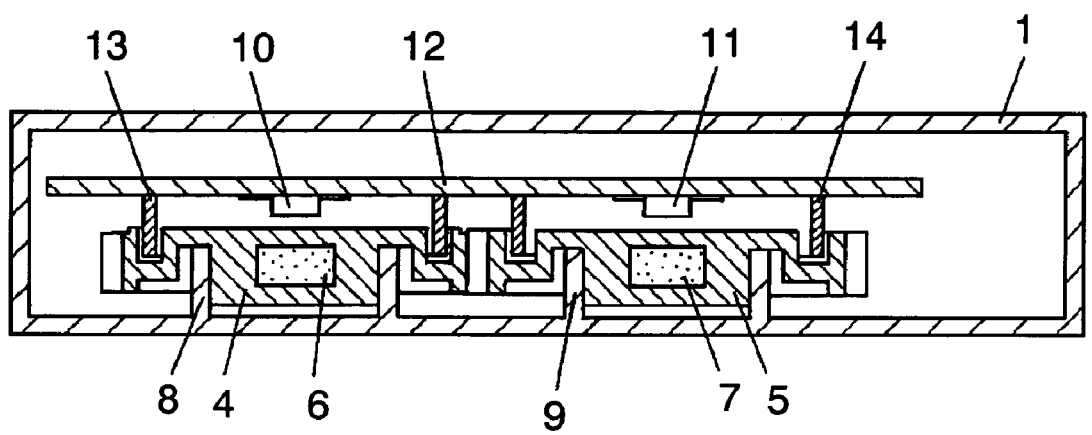
FIG. 15 is a side sectional view of another rotation angle-detecting device of the embodiment of the present invention.
Figure 16:
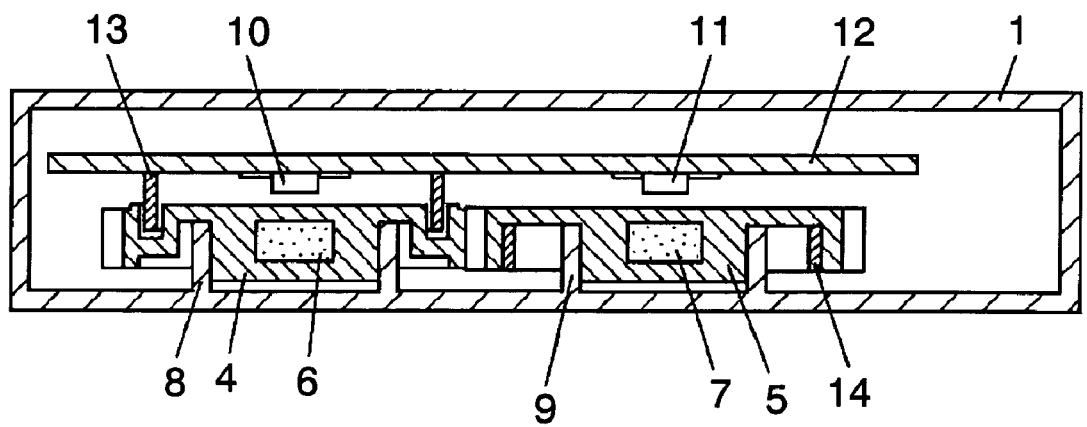
FIG. 16 is a side sectional view of still another rotation angle-detecting device of the embodiment of the present invention.

Although the aforementioned embodiment introduces the compact structure in which ring-shaped ferromagnetic bodies 13 and 14 are disposed around rotator 4 and rotator 5, respectively, it is not limited thereto. The structures shown in FIG. 15 and FIG. 6 can provide the same effect. As shown in FIG. 15, ferromagnetic bodies 13 and 14 can be disposed on the side of AMR elements 10 and 11. One of ferromagnetic bodies 13 and 14 can be disposed on the side of AMR element 10, and another is disposed on the side of rotator 5 as shown in FIG. 16. These structures expand the degree of freedom on design. As another possibility, disposing a ferromagnetic body at any one of AMR element 10, AMR element 11, rotator 4, and rotator 5 can suppress the interference between magnetic lines 15 from magnets 6 and 7.

Figure 17:
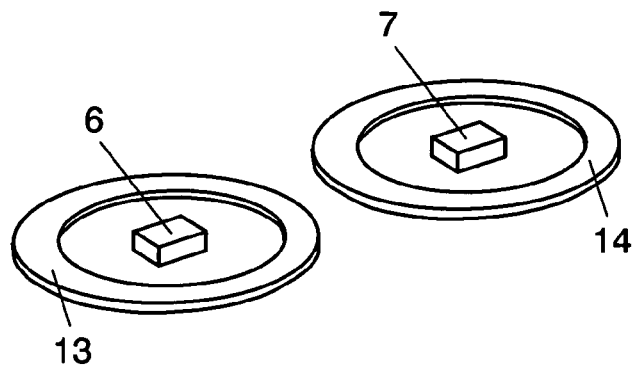
FIG. 17 shows another ferromagnetic body of the embodiment of the present invention.
Figure 18:
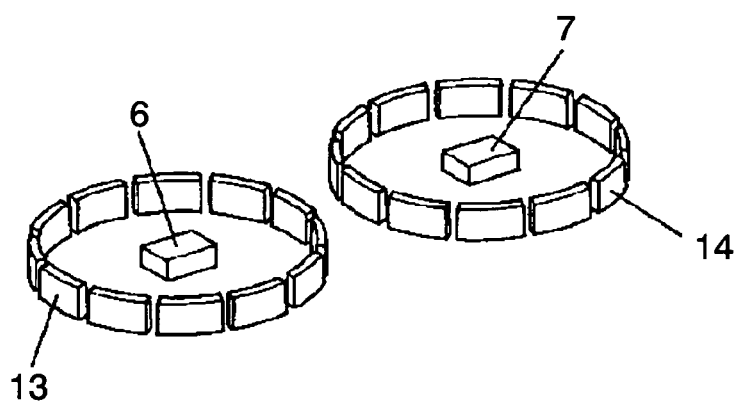
FIG. 18 shows still another ferromagnetic body of the embodiment of the present invention.
Figure 19:
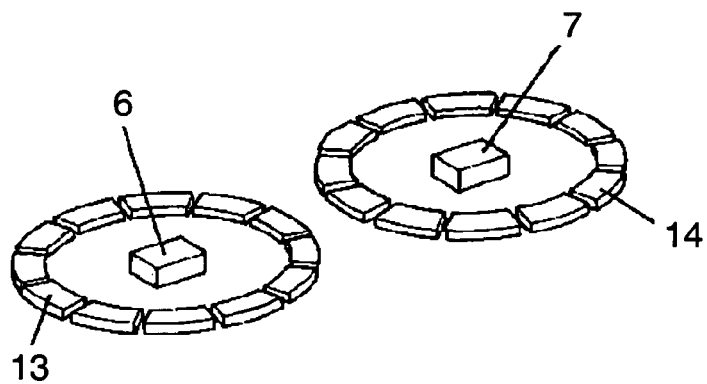
FIG. 19 shows yet another ferromagnetic body of the embodiment of the present invention.

Ferromagnetic bodies 13 and 14 can be formed of any material as long as having good magnetic permeability—among of all, an iron-based material is suitable in terms of easy handling and cost efficiency. In the structure of FIG. 17, ring-shaped ferromagnetic bodies 13 and 14 are punched out from a low-cost material: an iron-based plate. Ferromagnetic bodies 13 and 14 can be made in a manner of cutting a strip-shape material into pieces and placing them in the form of a ring as shown in FIG. 18. Ferromagnetic bodies 13 and 14 can be made in a manner of arranging punched-out pieces in the form of a ring as shown in FIG. 19. Ferromagnetic bodies 13 and 14 are fixed to rotators 4 and 5 through bonding, fitting, molding, or the like.

Although rotators 2, 4, and 5 of the embodiment have gears 2C, 4A, and 5A, respectively, on the periphery to have a mesh engagement, it is not limited thereto; the similar effect is expected in the structure—instead of the gears, forming each peripheral surface of rotators 2, 4, 5 with a material having a high coefficient of friction to make an intimate contact therebetween.

In addition, calculator 20 may be individually disposed, instead of being mounted on PCB 12.

INDUSTRIAL APPLICABILITY

The rotation angle-detecting device of the present invention contains directly connected two detecting rotators for detecting the rotation angle of the main rotator. Each of the detecting rotators has the ring-shaped ferromagnetic body close to the magnet or magnetic detector. With the structure, the rotation angle-detecting device can provide an absolute rotation angle of a rotator having more than two rotations with high accuracy. Having a low parts count, the detecting device can be easily downsized with reliability in measurement accuracy.

The invention claimed is:

1. A rotation angle-detecting device comprising:
   a main rotator;
   a first detecting rotator having contact with the main rotator, and for rotating faster than the main rotator;
   a first magnet located at a center of the first detecting rotator;
   a first magnetic detector located adjacent a surface opposite the first magnet;
   a second detecting rotator having contact with the first detecting rotator, the second detecting rotator for rotating differently in speed from the first detecting rotator;
   a second magnet located at a center of the second detecting rotator;
   a second magnetic detector located adjacent a surface opposite the second magnet; and
   a first ferromagnetic body encircling one of said first magnet and said second magnet, and incorporated in and thus rotatable with one of the first or second detecting rotators.

2. The rotation angle-detecting device of claim 1, wherein each of the first magnetic detector and the second magnetic detector includes an anisotropic magnetic resistance element.

3. The rotation angle-detecting device of claim 1 further comprising a second ferromagnetic body incorporated in one of the first magnetic detector or the second magnetic detector,
   wherein when the first ferromagnetic body is incorporated in the first detecting rotator, the second ferromagnetic body is incorporated in the second magnetic detector, and when the first ferromagnetic body is incorporated in the second detecting rotator, the second ferromagnetic body is incorporated in the first magnetic detector.

4. The rotation angle-detecting device of claim 1, wherein the first ferromagnetic body comprises a ring-shaped iron plate.

5. The rotation angle-detecting device of claim 1, wherein the first ferromagnetic body comprises pieces arranged in a form of a ring.

6. The rotation angle-detecting device of claim 1 further comprising a calculator for calculating a rotation angle of the main rotator according to outputs from the first magnetic detector and the second magnetic detector.

7. The rotation angle-detecting device of claim 6, wherein the calculator is for calculating the rotation angle of the main rotator from a phase difference in the outputs of the first magnetic detector and the second magnetic detector.

8. The rotation angle-detecting device of claim 1, wherein the first ferromagnetic body is encircling only one of the first magnet and the second magnet.

9. The claim according to claim 1, wherein the first ferromagnetic body is configured to prevent a magnetic effect of the first magnet on the second magnetic detector or to prevent a magnetic effect of the second magnet on the first magnetic detector.

* * * * *